US006440183B1

(12) United States Patent
Lake

(10) Patent No.: US 6,440,183 B1
(45) Date of Patent: *Aug. 27, 2002

(54) METHODS OF INSULATING BUTTON-TYPE BATTERIES

(75) Inventor: Rickie C. Lake, Eagle, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/516,608

(22) Filed: May 1, 2000

Related U.S. Application Data

(63) Continuation of application No. 08/953,812, filed on Oct. 20, 1997, now abandoned.

(51) Int. Cl.[7] ............................................. H01M 2/02
(52) U.S. Cl. ................................. 29/623.2; 29/623.5
(58) Field of Search ............................. 29/623.2, 623.5

(56) References Cited

U.S. PATENT DOCUMENTS 2,178,969 A 11/1939 Ruben
3,655,455 A 4/1972 Jones
3,935,026 A 1/1976 Howard
4,087,595 A 5/1978 Mallery et al.
4,258,108 A 3/1981 Glasser
5,270,133 A 12/1993 Baumann, III
RE35,746 E 3/1998 Lake

OTHER PUBLICATIONS

"Handbook of Batteries", Linden, David; McGraw–Hill, Second Edition, p. 12.14, 1995 (No month).

*Primary Examiner*—John S. Maples
(74) *Attorney, Agent, or Firm*—Wells, St. John, P.S.

(57) ABSTRACT

Methods of insulating batteries, and in particular thin-profile batteries comprising button-type batteries and resultant insulated battery constructions are described. In one aspect, a flowable insulating material is distributed over an edge region of a battery and subsequently provided into a generally non-flowable state. In one implementation, the battery is rotated while the flowable material is provided over the edge region. Provision of the flowable material over the edge region can comprise dipping the edge region into a volume of flowable material or dispensing a desired amount of flowable material over the edge region. In another implementation, an insulating jacket is provided over the battery having a minimum thickness of no greater than about 2 mils.

54 Claims, 10 Drawing Sheets

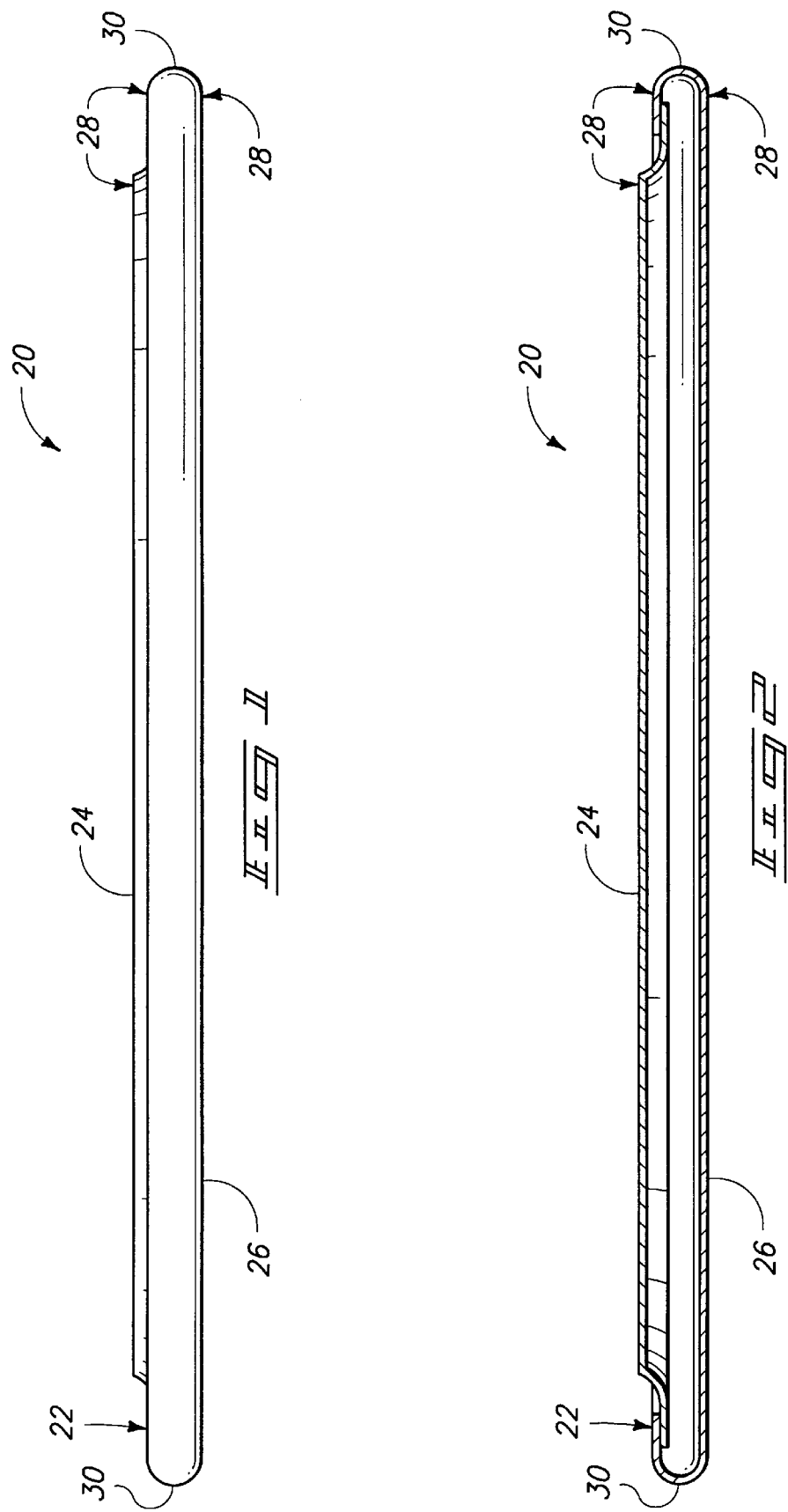

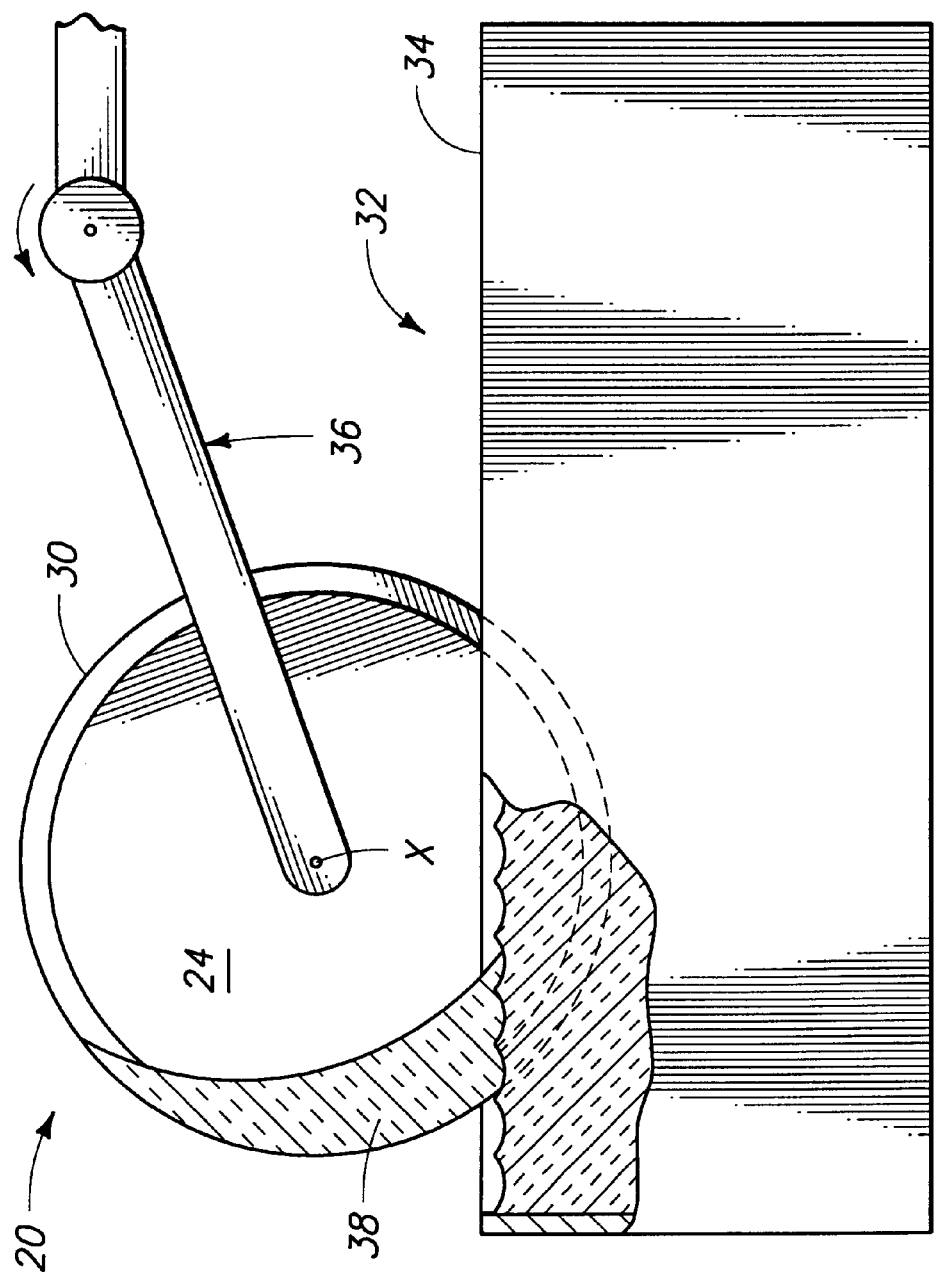

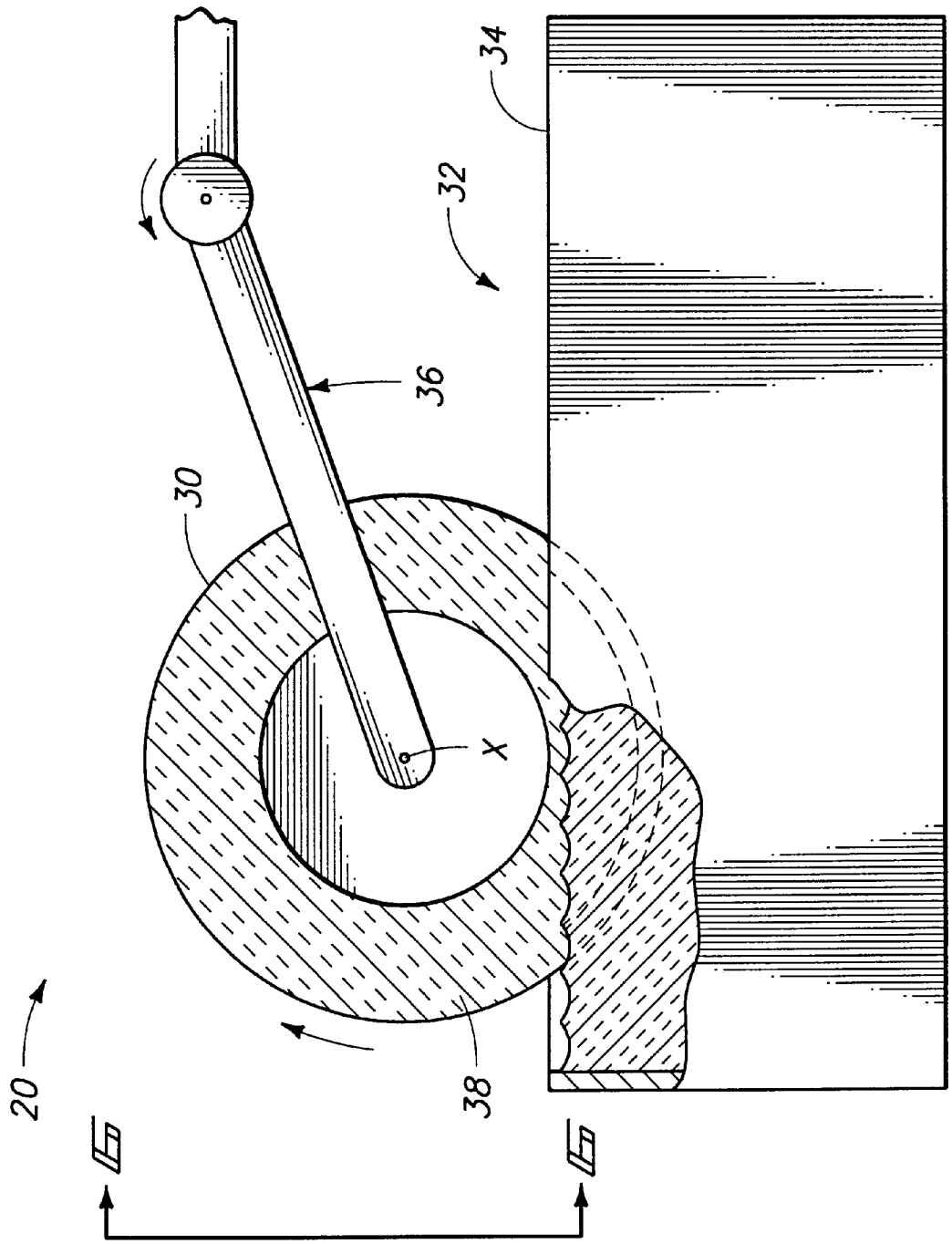

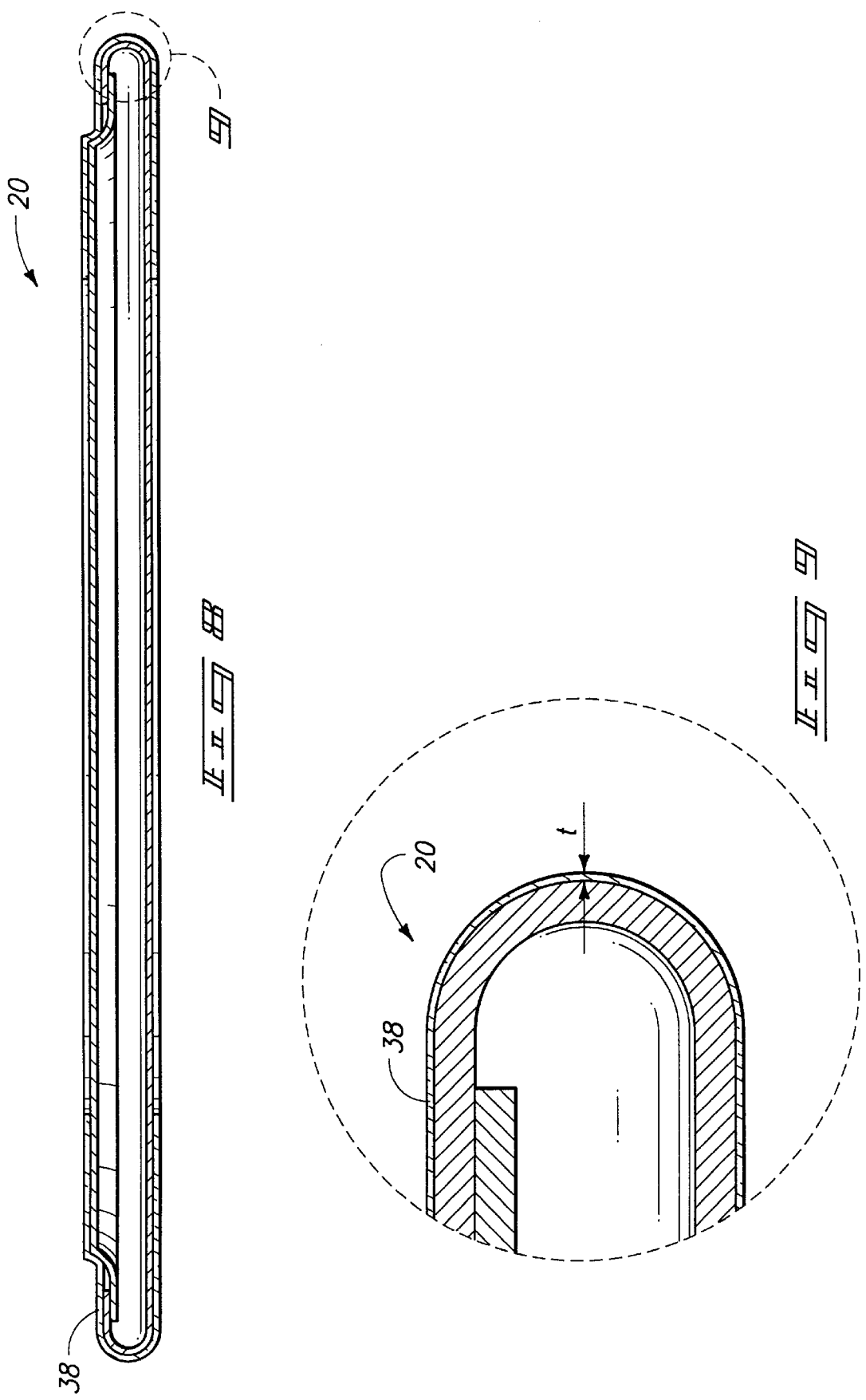

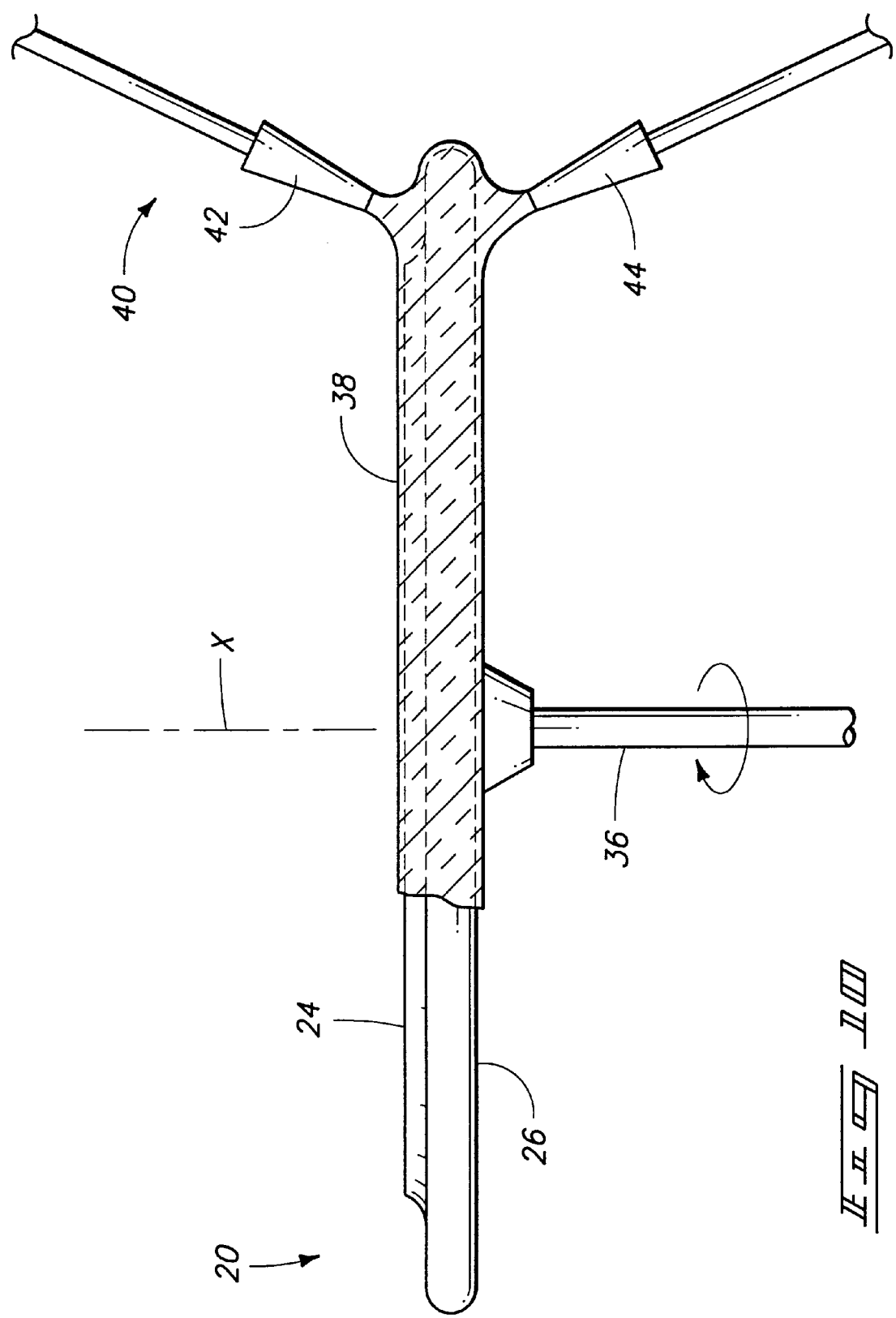

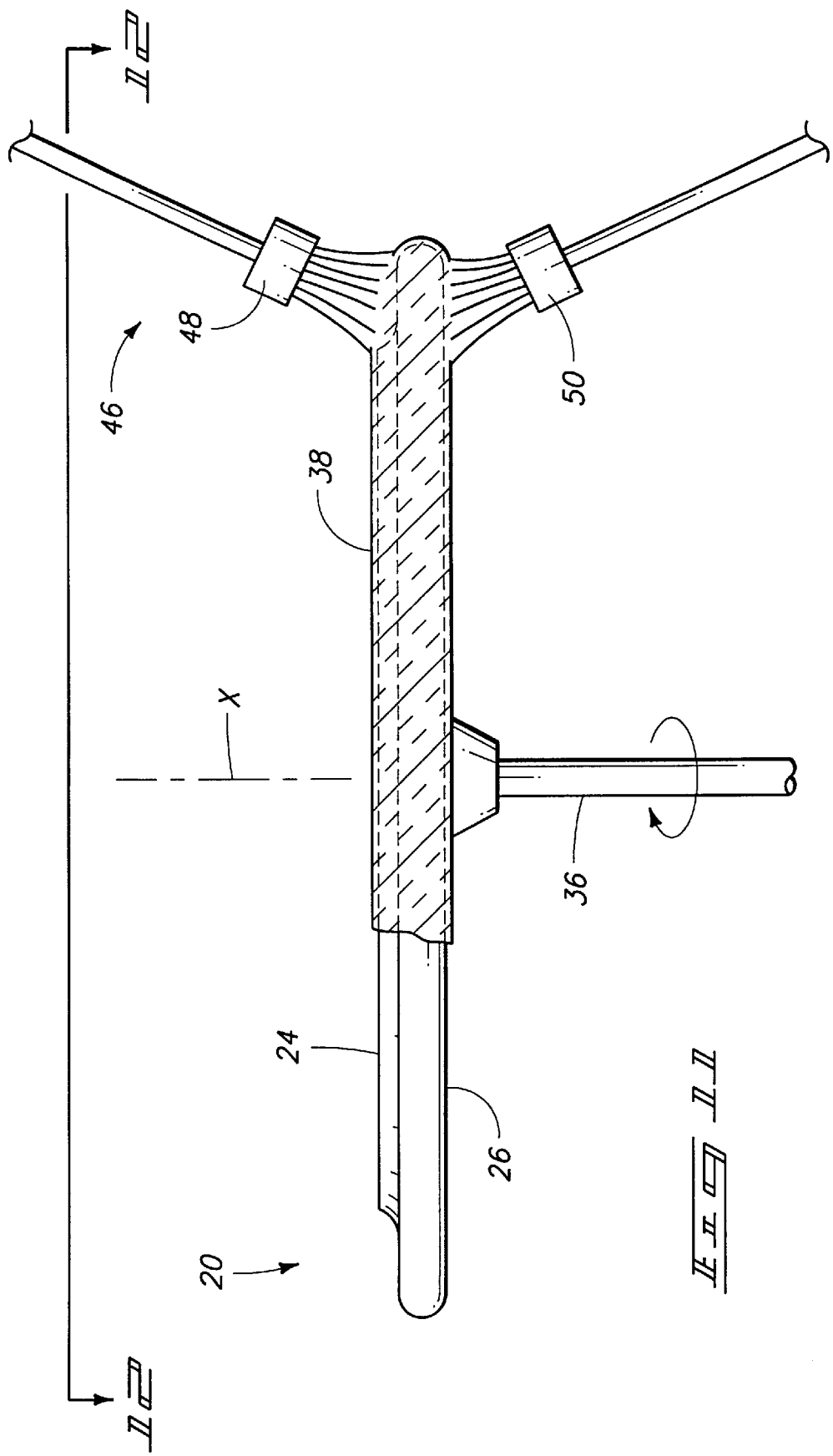

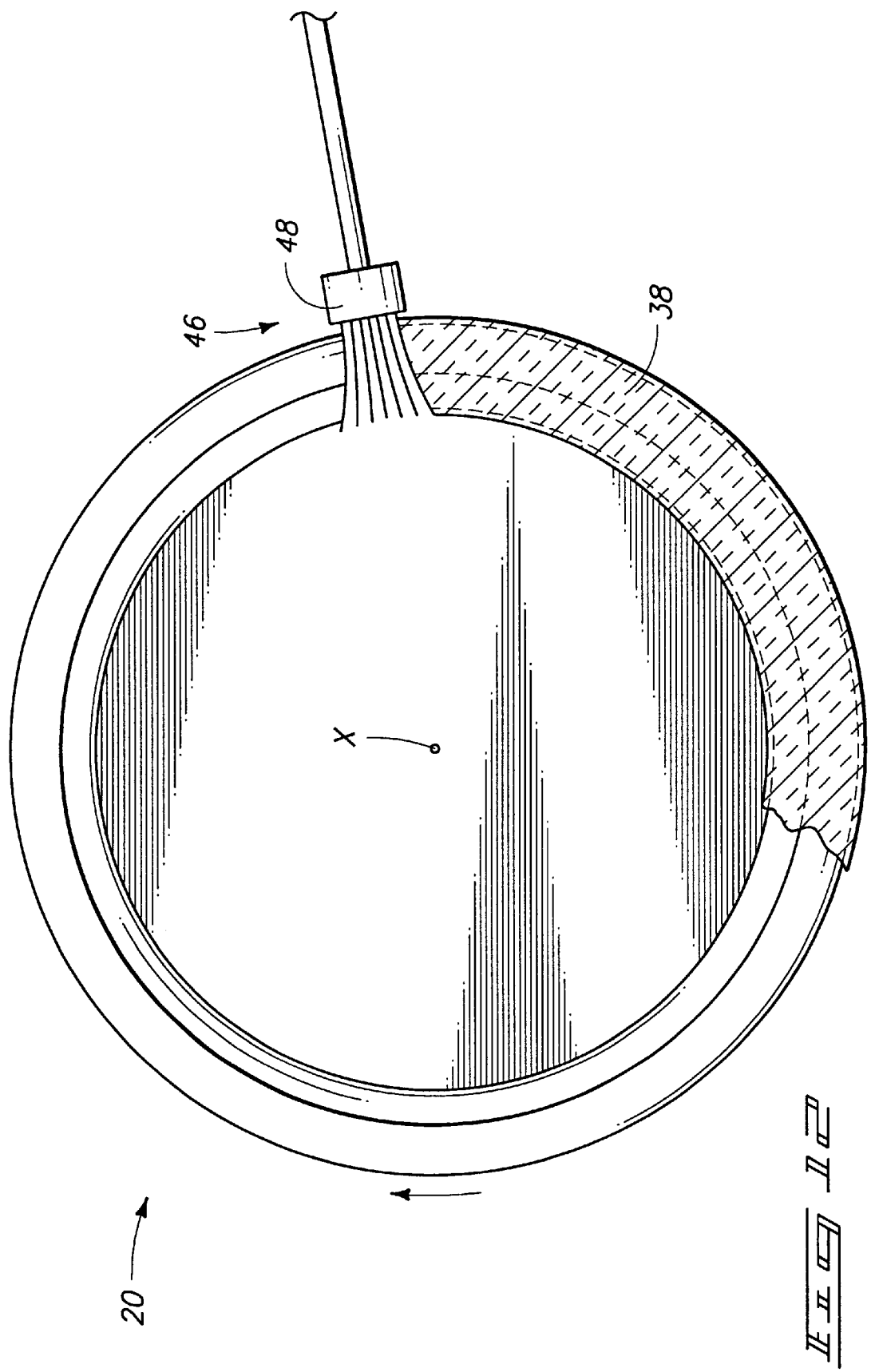

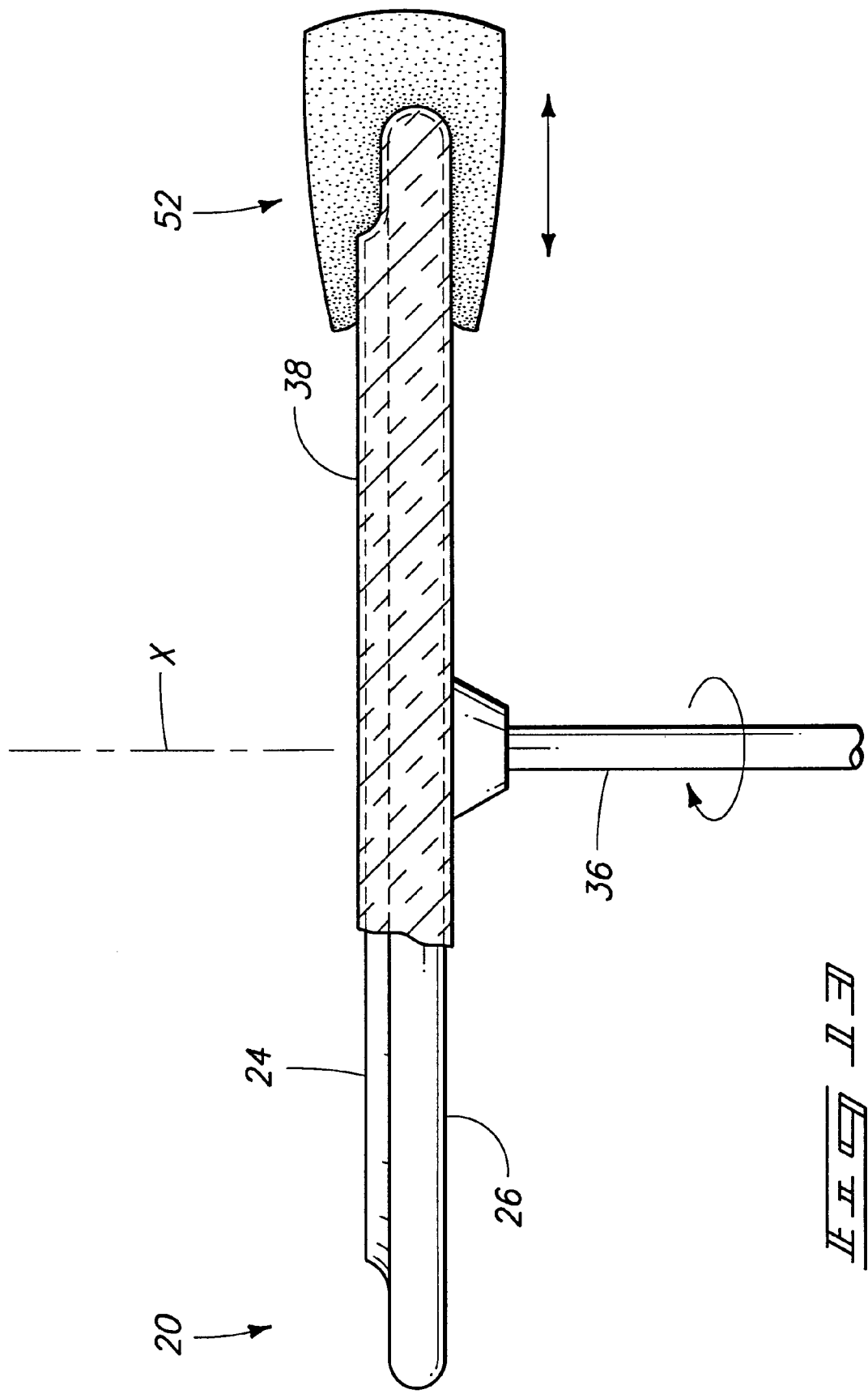

METHODS OF INSULATING BUTTON-TYPE BATTERIES

RELATED PATENT DATA

This patent resulted from a continuation application of and claims priority to U.S. patent application Ser. No. 08/953,812, filed Oct. 20,1997, entitled "Methods of Insulating Button-Type Batteries (As Amended)", naming Rickie C. Lake as inventor, the disclosure of which is incorporated by reference now abandoned.

TECHNICAL FIELD

This invention relates to methods of insulating batteries, and in particular to methods of insulating thin-profile batteries comprising button-type batteries. The invention also relates to insulated batteries, and in particular insulated thin-profile batteries comprising button-type batteries.

BACKGROUND OF THE INVENTION

Thin-profile batteries are characterized by having thickness dimensions which are less than a maximum linear dimension of its anode or cathode. One type of thin-profile battery is a button-type battery. Such batteries, because of their compact size, permit electronic devices to be built which themselves are very small or compact. One concern associated with such thin-profile batteries pertains to protecting the batteries from becoming grounded to one another or to other structures comprising a device in which such battery or batteries are incorporated.

This invention arose out of concerns associated with providing methods of insulating batteries, and in particular button-type batteries, and resultant battery constructions which improve upon currently employed methodologies and constructions.

SUMMARY OF THE INVENTION

Methods of insulating batteries, and in particular thin-profile batteries comprising button-type batteries and resultant insulated battery constructions are described. In one aspect, a flowable insulating material is distributed over an edge region of a battery and subsequently provided into a generally non-flowable state. In one implementation, the battery is rotated while the flowable material is provided over the edge region. Provision of the flowable material over the edge region can comprise dipping the edge region into a volume of flowable material or dispensing a desired amount of flowable material over the edge region. In another implementation, an insulating jacket is provided over the battery having a minimum thickness of no greater than about 2 mils.

BRIEF DESCRIPTION OF THE DRAWINGS

Preferred embodiments of the invention are described below with reference to the following accompanying drawings.

FIG. 1 is a side elevation of a thin-profile battery comprising a button-type battery.

FIG. 2 is a side sectional view of the FIG. 1 battery.

FIG. 4 is a view of the FIG. 3 battery at a different processing point.

FIG. 5 is a view of the FIG. 3 battery at a different processing point.

FIG. 8 is a view of the FIG. 1 battery at a different processing point.

FIG. 9 is an enlarged view of a portion of FIG. 8.

FIG. 10 is a side elevation of a thin-profile battery undergoing processing in accordance with another aspect of the invention.

FIG. 11 is a side elevation of a thin-profile battery undergoing processing in accordance with another aspect of the invention.

FIG. 12 is a top view of the FIG. 11 thin-profile battery undergoing processing.

FIG. 13 is a side elevation of a thin-profile battery undergoing processing in accordance with another aspect of the invention.

DETAILED DESCRIPTION OF THE PREFERRED EMBODIMENTS

Figure 3:
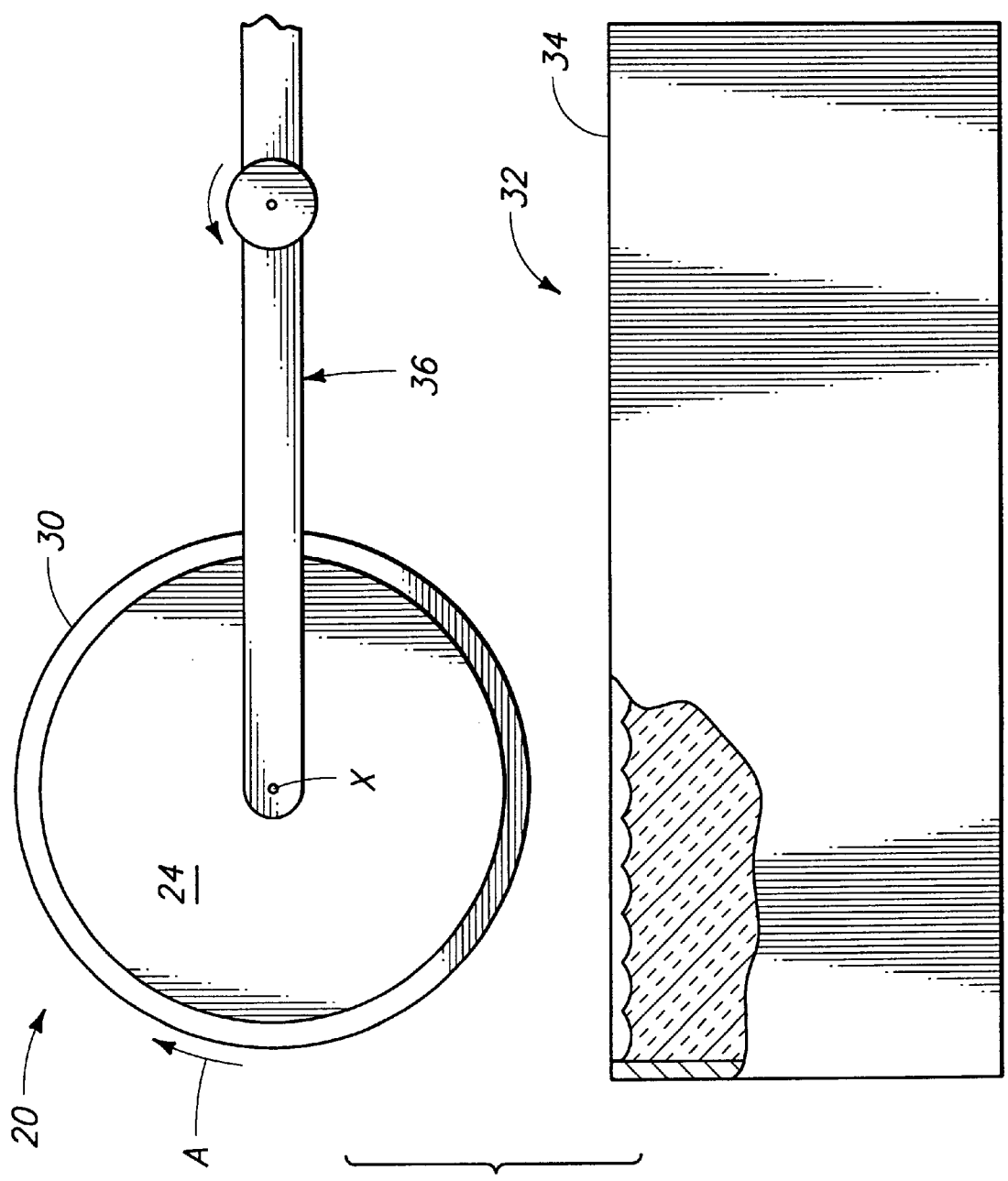
FIG. 3 is a side view of a thin-profile battery undergoing processing in accordance with one aspect of the invention.

This disclosure of the invention is submitted in furtherance of the constitutional purposes of the U.S. Patent Laws "to promote the progress of science and useful arts" (Article 1, Section 8).

Referring to FIGS. 1 and 2, a battery is shown generally at 20. In the illustrated example, battery 20 is a thin-profile battery comprising a button-type battery. Battery 20 comprises a pair of terminal housing members which define in part an outer conductive surface 22 of the battery. Surface 22 comprises first and second respective outwardly-facing electrode surfaces 24, 26 which are defined in part by the different respective terminal housing members. Where battery 20 comprises a button-type battery, electrode surface 24 defines a lid electrode and electrode surface 26 defines a can electrode.

Battery 20 also includes an edge region 28 which can include portions of one or both electrode surfaces 24, 26. A perimeter edge 30 defies an outermost extent of edge region 28. At least a portion of first and second electrode surfaces 24, 26 are generally planar and are joined or connected proximate edge region 28 and peripheral edge 30 as best shown in FIG. 2. The battery includes an anode and a cathode which are contained inside outer surface 22. The anode is in electrical communication with the lid electrode and the cathode is in electrical communication with the can electrode.

Referring to FIG. 3, a volume of generally flowable insulating material is provided generally at 32 and is contained by a container 34. An example includes "Loctite Shadowcure 394" manufactured by Loctite Corporation of Newington, Conn. An engagement mechanism 36 is provided and suitably engages battery 20. Battery 20 is then rotated about a central axis x which is substantially normal to at least one of the generally planar terminal housing member surfaces. In the example, the battery is rotated in the direction of arrow A.

Referring to FIG.4, and while battery 20 is being rotated, engagement mechanism 36i moves the battery into contact with the flowable insulating material 32 within container 34. The battery is moved through the flowable material which forms a coating 38 over at least peripheral edge 30. Coating 38 can be, and preferably is formed over edge region 28 (FIG. 1) of the battery. Accordingly, coating 38 is formed over at least one and preferably both electrode surface portions comprising edge region 28. FIG. 4 shows coating 38 covering only a portion of edge 30 because the battery has not yet been completely rotated about central axis x.

Figure 6:
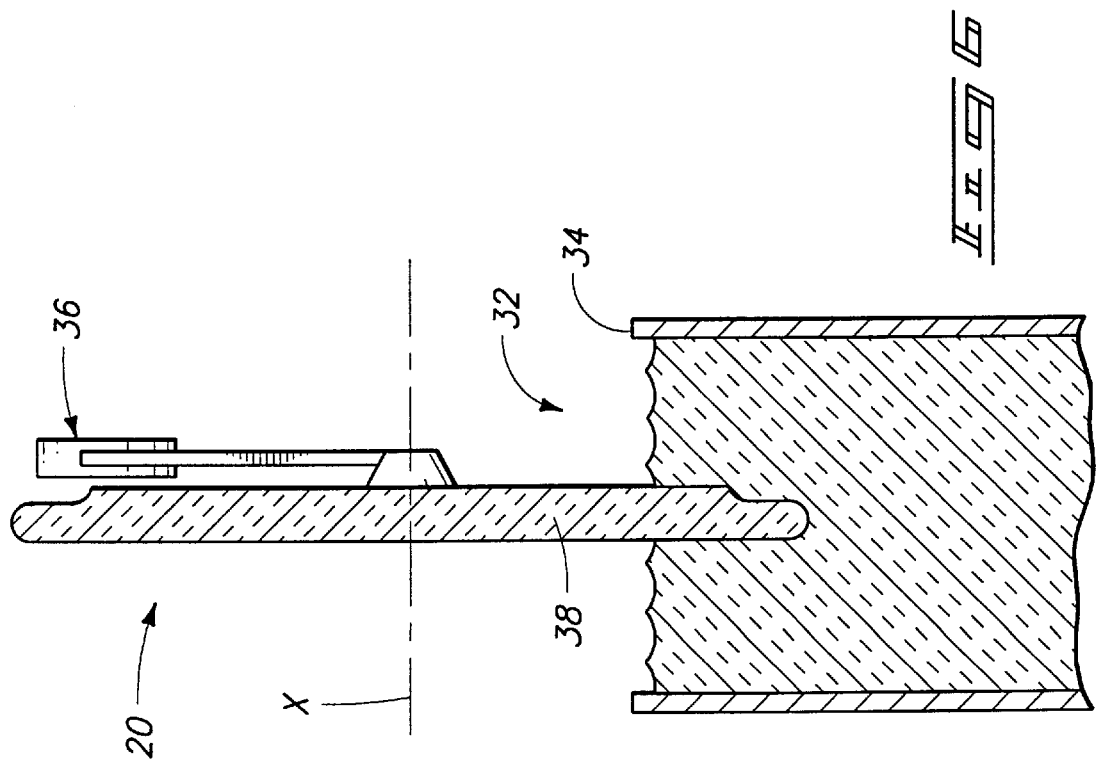
FIG. 6 is a view which is taken along line 6—6 in FIG. 5 with a portion broken away to show detail.

Referring to FIGS. 5 and 6, battery 20 has been moved through the flowable material sufficiently to forming a coating about the entirety of peripheral edge 30. Accordingly, coating 38 is distributed over the edge region.

Figure 7:
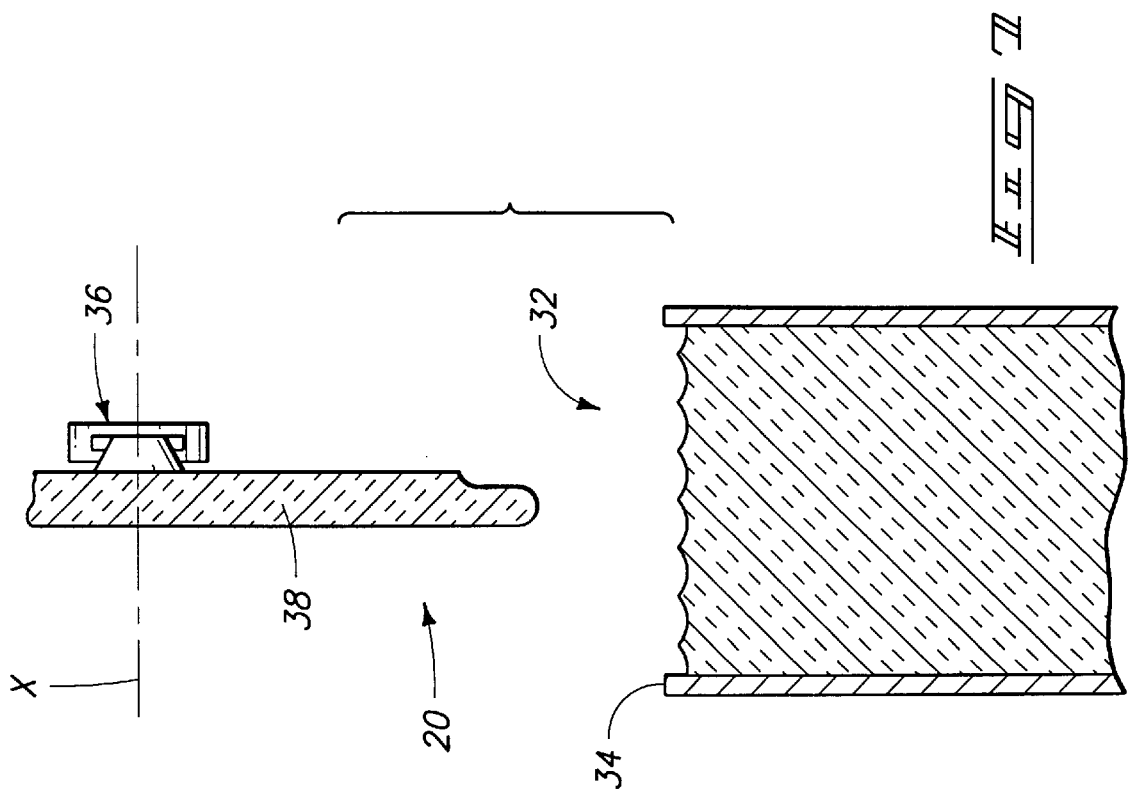
FIG. 7 is a view similar to the FIG. 6 view at a different processing point.

Referring to FIG. 7, engagement mechanism 36 moves battery 20 away from and out of physical contact with flowable insulating material 32. The processing described in connection with FIGS. 3–7 constitutes but one way in which a generally flowable insulating material is distributed over at least a portion of battery 20 by dipping the subject battery portion into a volume of the flowable material.

After provision of the flowable insulating material onto the battery, the battery can be further rotated for a duration which is sufficient to cast undesirable excess flowable material from the battery. In some instances, additional rotation may be desirable to provide a uniformly and thinly distributed layer of insulating material over the battery. Rotation speeds can vary. Accordingly, speeds between 50 to 5000 RPMs are suitable for processing. A lower speed such as one around 72 RPMs is more preferred at least for the initial application of flowable material. The higher speeds are suitable for such additional rotation as may be desired to cast excess material from the battery or to form a thinly distributed layer over the battery.

Referring to FIGS. 8 and 9, the flowable insulating material of coating 38 is exposed to conditions which are effective to render the flowable material into a generally non-flowable state. In the illustrated example, an exemplary insulating material comprises a curable plastic resin. Such conditions might include merely allowing the flowable material, applied at an elevated temperature, to cool at room temperature into a solidified mass. Alternately, heat might be used to cure some systems. Further alternately, ultraviolet curable materials can be utilized so that the non-flowable state is achieved through application of suitable ultraviolet curing conditions. For example, the above-referenced "Loctite Shadowcure 394" material can be rendered into the non-flowable state either thermally or through ultraviolet curing. Other systems, such as epoxy, may only have short working lives whereby chemical curing occurs fairly rapidly at room temperature. Further alternately by way of example only, a reactive gas environment might be utilized to achieve cure. Additionally, a solvent-based system can be utilized whereby solids, such as polymers, may be dissolved in an appropriate solvent to provide a flowable material. After applying such material to a battery as described above and below, the battery can be rotated at a higher RPM to not only cast excess material from the battery, but to expose the coated-on material to evaporation conditions which facilitate evaporation of the solvent. An exemplary material is EPDM rubber dissolved in cyclohexane.

In one aspect, provision of the insulating material into the non-flowable state provides a generally non-flowable covering or insulating jacket having a thickness t of no greater than about 2 mils. More preferably, thickness t is greater than about 0.25 mil and no greater than about 1 mil. In another aspect, the insulating jacket is disposed over at least 60% of the battery conductive outer surface. The insulating jacket can be disposed over more than 70% of the conductive outer surface.

Referring to FIGS. 10–13, alternate implementations are shown in which the generally flowable insulating material is applied or distributed over the battery by various dispensing apparatuses. Battery 20 is engaged with engagement mechanism 36 which rotates the battery about its central axis x. As shown in FIG. 10, a dispensing apparatus 40 comprises at least one and preferably two nozzles 42, 44 which dispense the flowable material onto at least perimeter edge 30 and preferably edge region 28 as the battery rotates. Accordingly, portions of both terminal housing members 24, 26 are coated with the flowable insulating material. The insulating material is subsequently exposed to conditions which are effective to render it into a generally non-flowable state as discussed above in connection with FIGS. 8 and 9. Thickness and area dimensions are as described above.

Referring to FIGS. 11 and 12, a dispensing apparatus 46 comprises a at least one and preferably two brushes 48, 50 respectively, for dispensing the insulating material over battery 20. The brushes engage battery 20 and contain the insulating material such that coating 38 is formed thereover. Subsequent processing is as described above.

Referring to FIG. 13, a dispensing apparatus in the form of a substantially elastic porous mass 52 is provided and contains an amount of insulating material. Mass 52 is generally moved into engagement with battery 20 as the battery is rotated as described above. The battery is received by mass 52 which conformably engages the edge region of the battery as shown. Accordingly, insulating material is provided thereover. Subsequent processing is as described above.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A method of insulating a button-type battery comprising:

distributing a flowable insulating material over an edge region of a button-type battery; and exposing the flowable insulating material to conditions effective to render the flowable insulating material into a generally non-flowable state;

wherein the distributing and the exposing comprise distributing and exposing to provide at least portions of conductive surfaces of the button-type battery outwardly exposed.

2. The method of insulating a button-type battery of claim 1, wherein:

the button-type battery comprises first and second generally outwardly-facing electrode surfaces and a perimeter edge, the perimeter edge and at least a portion of one of the electrode surfaces comprising at least a portion of the edge region; and the distributing of the flowable insulating material comprises distributing said material over the one electrode surface portion.

3. The method of insulating a button-type battery of claim 2, wherein the distributing of the flowable material comprises dipping said edge region into a volume of said flowable material.

4. The method of insulating a button-type battery of claim 2, wherein the distributing of the flowable material comprises dispensing said flowable material onto said edge region.

5. The method of insulating a button-type battery of claim 1, wherein:
the button-type battery comprises first and second generally outwardly-facing electrode surfaces and a perimeter edge, the perimeter edge and portions of both of the electrode surfaces comprising at least a portion of the edge region; and
the distributing of the flowable insulating material comprises distributing said material over the electrode surface portions.

6. The method of insulating a button-type battery of claim 5, wherein the distributing of the flowable material comprises dipping said edge region into a volume of said flowable material.

7. The method of insulating a button-type battery of claim 5, wherein the distributing of the flowable material comprises dispensing said flowable material onto said edge region.

8. The method of insulating a button-type battery of claim 1, wherein:
the button-type battery comprises first and second generally outwardly-facing electrode surfaces and a perimeter edge, the perimeter edge comprising at least a portion of the edge region; and
the distributing of the flowable insulating material comprises distributing said material over the perimeter edge.

9. The method of insulating a button-type battery of claim 8, wherein the distributing of the flowable material comprises dipping said edge region into a volume of said flowable material.

10. The method of insulating a button-type battery of claim 8, wherein the distributing of the flowable material comprises dispensing said flowable material onto said edge region.

11. The method according to claim 1 wherein the distributing comprises distributing the flowable insulating material over the edge region of the button-type battery having a single lid electrode and a single can electrode.

12. A method of insulating a button-type battery comprising:
providing a button-type battery having a rounded edge region;
distributing a flowable insulating material over the rounded edge region of the button-type battery; and
rendering the flowable insulating material into a generally non-flowable state;
wherein the distributing and the rendering comprise distributing and rendering to provide at least portions of conductive surfaces of the button-type battery outwardly exposed.

13. The method of claim 12, wherein the distributing of the flowable insulating material into the generally non-flowable state comprises forming an insulating jacket having a minimum thickness of no greater than about 2 mils.

14. The method according to claim 12 further comprising rotating the button-type battery during the distributing.

15. The method according to claim 12 wherein the providing comprises providing the button-type battery with a substantially circular edge region.

16. The method according to claim 12 wherein the providing comprises providing the button-type battery with plural outer surfaces individually including an electrode.

17. The method according to claim 12 wherein the providing comprises providing the button-type battery having a single lid electrode and a single can electrode.

18. A method of insulating a button-type battery comprising:
providing a button-type battery having an outer surface;
distributing a flowable insulating material over at least a portion of the outer surface; and
rendering the flowable insulating material into a generally non-flowable insulating jacket having a thickness of no greater than about 2 mils;
wherein the distributing and the rendering comprise distributing and rendering to provide at least portions of conductive surfaces of the button-type battery outwardly exposed.

19. The method of claim 18, wherein the distributing of the flowable material comprises moving at least a portion of the battery through a volume of the flowable material.

20. The method of claim 19, wherein said moving comprises rotating the battery about a defined axis.

21. The method of claim 18, wherein the distributing of the flowable material comprises moving at least one of the battery or the flowable material relative to the other during said distributing.

22. The method according to claim 18 wherein the providing comprises providing the battery with a rounded edge region.

23. The method according to claim 18 wherein the providing comprises providing the button-type battery having a single can electrode and a single lid electrode.

24. A method of insulating a button-type battery comprising:
providing a button-type battery having an edge region and a pair of generally planar, outwardly-facing terminal housing member surfaces joined proximate the edge region;
rotating the battery about a central axis which is substantially normal to at least one of the terminal housing member surfaces;
while rotating the battery, providing a generally flowable insulating material over the edge region; and
exposing the flowable material to conditions effective to render the flowable insulating material into a generally non-flowable state.

25. The method of insulating a button-type battery of claim 24, wherein the providing of the generally flowable insulating material comprises dipping a portion of the battery into a volume of the insulating material.

26. The method of insulating a button-type battery of claim 24, wherein the providing of the generally flowable insulating material comprises dipping at least the edge region of the battery into a volume of the insulating material.

27. The method of insulating a button-type battery of claim 24, wherein the providing of the generally flowable insulating material comprises dispensing said flowable insulating material onto the battery.

28. The method of insulating a button-type battery of claim 24, wherein the providing of the generally flowable insulating material comprises dispensing said flowable insulating material onto at least the edge region.

29. The method of insulating a button-type battery of claim 24, wherein the providing of the generally flowable insulating material comprises engaging the battery with a brush containing said insulating material and coating at least a portion of one of the terminal housing members with the insulating material.

30. The method of insulating a button-type battery of claim 27, wherein the providing of the generally flowable insulating material comprises coating portions of both of the terminal housing members with insulating material which is supplied from at least one brush.

31. The method of insulating a button-type battery of claim 24, wherein the providing of the generally flowable insulating material comprises engaging the battery with a substantially elastic porous mass containing said insulating material and coating at least a portion of one of the terminal housing members with the insulating material.

32. A method of insulating a button-type battery comprising:
providing a button-type battery having a perimeter edge and a pair of generally planar, outwardly-facing terminal housing member surfaces connected proximate the perimeter edge;
rotating the battery about a central axis which is substantially normal to at least one of the terminal housing member surfaces;
while rotating the battery, dipping at least the perimeter edge of the battery into a generally flowable insulating material and forming a coating of the flowable insulating material over at least a portion of the perimeter edge; and
exposing the flowable insulating material to conditions effective to render the flowable insulating material into a generally non-flowable state.

33. The method of insulating a button-type battery of claim 32, wherein the dipping of the perimeter edge of the battery comprises dipping at least a portion of one of the terminal housing member surfaces into the flowable insulating material.

34. The method of insulating a button-type battery of claim 32, wherein the dipping of the perimeter edge of the battery comprises dipping portions of both of the terminal housing member surfaces into the flowable insulating material.

35. The method of insulating a button-type battery of claim 32 further comprising after dipping the perimeter edge of the battery into the flowable insulating material, rotating the battery for a duration sufficient to cast some of the flowable insulating material off the battery.

36. The method of insulating a button-type battery of claim 32, wherein the flowable insulating material comprises a curable material and the exposing of the flowable material comprises curing said material into the generally non-flowable state.

37. The method of insulating a button-type battery of claim 36, wherein said curable material comprises a plastic material.

38. The method of insulating a button-type battery of claim 32, wherein the exposing of the flowable insulating material comprises rendering a generally non-flowable covering over the perimeter edge having a thickness of no greater than about 2 mils.

39. The method of insulating a button-type battery of claim 38, wherein said covering has a thickness greater than about 0.25 mils.

40. The method of insulating a button-type battery of claim 32, wherein the exposing of the flowable insulating material comprises rendering a generally non-flowable covering over at least a portion of one of the terminal housing member surfaces having a thickness of no greater than about 2 mils.

41. A method of insulating a button-type battery comprising:
providing a button-type battery having a pair of generally planar, outwardly-facing terminal housing member surfaces joined proximate a perimeter edge;
rotating the battery about a central axis which is substantially normal to at least one of the terminal housing member surfaces;
while rotating the battery, dispensing a generally flowable insulating material onto the battery and over at least a portion of one of the terminal housing member surfaces and forming a coating of the flowable insulating material over at least some of said portion; and
exposing the flowable insulating material to conditions effective to render the flowable insulating material into a generally non-flowable state.

42. The method of insulating a button-type battery of claim 41, wherein the dispensing of the flowable insulating material comprises dispensing said material over portions of both terminal housing member surfaces.

43. The method of insulating a button-type battery of claim 42, wherein the dispensing of the flowable insulating material comprises engaging the battery with a brush containing said insulating material.

44. The method of insulating a button-type battery of claim 41, wherein the dispensing of the flowable insulating material comprises dispensing said material over the perimeter edge.

45. The method of insulating a button-type battery of claim 41, wherein the dispensing of the flowable insulating material comprises engaging the battery with a brush containing said insulating material.

46. The method of insulating a button-type battery of claim 41, wherein the exposing of tile flowable material comprises rendering a generally non-flowable covering over the battery having a thickness of no greater than about 2 mils.

47. The method of insulating a button-type battery of claim 46, wherein said covering has a thickness greater than about 0.25 mils.

48. A method of insulating a button-type battery comprising:
providing a button-type battery having a pair of generally planar, outwardly-facing terminal housing member surfaces joined proximate a perimeter edge;
applying a generally flowable insulating material onto the battery and over at least a portion of one of the terminal housing member surfaces and forming a coating of the flowable insulating material over at least some of said portion, said applying not including dipping of any portion of said battery into a volume of said flowable insulating material;
rotating the battery during the applying, the rotating comprising rotating the battery about a central axis which is substantially normal to at least one of terminal housing member surfaces; and
exposing the flowable insulating material to conditions effective to render the flowable insulating material into a generally non-flowable state.

49. The method according to claim 48 wherein the providing comprises providing the button-type battery having a single can electrode and a single lid electrode.

50. The method according to claim 48 wherein the applying and the exposing comprise applying and exposing to provide at least portions of conductive surfaces comprising the outwardly-facing terminal housing member surfaces of the button-type battery outwardly exposed.

51. A method of insulating a button-type battery comprising:
distributing a flowable insulating material over an edge region of a button-type battery comprising first and second generally outwardly-facing electrode surfaces and a perimeter edge, the perimeter edge and at least a portion of one of the electrode surfaces comprising at least a portion of the edge region, and wherein the distributing comprises dipping said edge region into a volume of said flowable material and distributing said material over the one electrode surface portion; and exposing the flowable insulating material to conditions effective to render the flowable insulating material into a generally non-flowable state.

52. A method of insulating a button-type battery comprising:

distributing a flowable insulating material over an edge region of a button-type battery; and exposing the flowable insulating material to conditions effective to render the flowable insulating material into a generally non-flowable state, wherein the button-type battery comprises first and second generally outwardly-facing electrode surfaces and a perimeter edge, the perimeter edge and portions of both of the electrode surfaces comprising at least a portion of the edge region, and the distributing of the flowable insulating material comprises distributing said material over the electrode surface portions and dipping said edge region into a volume of said flowable material.

53. A method of insulating a button-type battery comprising:

distributing a flowable insulating material over an edge region of a button-type battery; and exposing the flowable insulating material to conditions effective to render the flowable insulating material into a generally non-flowable state, wherein the button-type battery comprises first and second generally outwardly-facing electrode surfaces and a perimeter edge, the perimeter edge comprising at least a portion of the edge region, and the distributing of the flowable insulating material comprises distributing said material over the perimeter edge and dipping said edge region into a volume of said flowable material.

54. A method of insulating a button-type battery comprising:

providing a button-type battery having a pair of generally planar, outwardly-facing terminal housing member surfaces joined proximate a perimeter edge;

applying a generally flowable insulating material onto the battery and over at least a portion of one of the terminal housing member surfaces and forming a coating of the flowable insulating material over at least some of said portion, said applying not including dipping of any portion of said battery into a volume of said flowable insulating material; and exposing the flowable insulating material to conditions effective to render the flowable insulating material into a generally non-flowable state, wherein the applying and the exposing comprise applying and exposing to provide at least portions of conductive surfaces comprising the outwardly-facing terminal housing member surfaces of the button-type battery outwardly exposed.

* * * * *

UNITED STATES PATENT AND TRADEMARK OFFICE
CERTIFICATE OF CORRECTION

PATENT NO. : 6,440,183 B1 Page 1 of 1
DATED : August 27, 2001
INVENTOR(S) : Rickie C. Lake It is certified that error appears in the above-identified patent and that said Letters Patent is hereby corrected as shown below:

Column 2,
Line 60, please delete "36i" after "mechanism" and insert -- 36 --.

Column 4,
Line 14, please delete "a" after "comprises".
Lines 51-59, please replace the entire claim 2 with the following:
-- The method of insulating a button-type battery of claim 1, wherein the distributing comprises distributing said material over at least a portion of one of the surfaces. --.

Column 5,
Lines 1-10, please replace the entire claim 5 with the following:
-- The method of insulating a button-type battery of claim 1, wherein the distributing comprises distributing said material over at least a portion of both of the surfaces. --.

Column 6,
Line 65, please delete "27" after "claim" and insert -- 29 --.

Column 8,
Line 29, please delete "tile" after "of" and insert -- the --.

Signed and Sealed this

Twenty-fourth Day of June, 2003

JAMES E. ROGAN
*Director of the United States Patent and Trademark Office*